US008701086B2

(12) United States Patent
Banerjee et al.

(10) Patent No.: US 8,701,086 B2
(45) Date of Patent: Apr. 15, 2014

(54) SIMPLIFYING ANALYSIS OF SOFTWARE CODE USED IN SOFTWARE SYSTEMS

(75) Inventors: Udayan Banerjee, Bangalore (IN); Eswaran Narasimhan, Bangalore (IN)

(73) Assignee: NIIT Technologies Ltd, New Delhi (IN)

( * ) Notice: Subject to any disclaimer, the term of this patent is extended or adjusted under 35 U.S.C. 154(b) by 137 days.

(21) Appl. No.: 13/351,248

(22) Filed: Jan. 17, 2012

(65) Prior Publication Data

US 2013/0185698 A1 Jul. 18, 2013

(51) Int. Cl.
*G06F 9/44* (2006.01)

(52) U.S. Cl.
USPC ........... 717/114; 717/110; 717/112; 717/141; 717/142; 717/143

(58) Field of Classification Search
None
See application file for complete search history.

(56) References Cited

U.S. PATENT DOCUMENTS

| | | | | |
|---|---|---|---|---|
| 6,311,327 | B1 * | 10/2001 | O'Brien et al. | 717/114 |
| 6,466,240 | B1 * | 10/2002 | Maslov | 715/234 |
| 7,007,266 | B1 * | 2/2006 | Isaacson | 717/100 |
| 8,489,388 | B2 * | 7/2013 | Bonnet et al. | 704/9 |
| 2002/0095660 | A1 * | 7/2002 | O'Brien et al. | 717/127 |
| 2004/0031015 | A1 * | 2/2004 | Ben-Romdhane et al. | 717/107 |
| 2004/0154000 | A1 * | 8/2004 | Kasravi et al. | 717/130 |
| 2005/0138222 | A1 | 6/2005 | Chari et al. | |
| 2006/0129993 | A1 | 6/2006 | Belisario et al. | |
| 2007/0214166 | A1 * | 9/2007 | Maeda et al. | 707/101 |
| 2007/0239762 | A1 | 10/2007 | Farahbod | |
| 2008/0109471 | A1 * | 5/2008 | Subbian et al. | 707/102 |
| 2008/0140694 | A1 | 6/2008 | Mangla | |
| 2008/0281580 | A1 * | 11/2008 | Zabokritski | 704/9 |
| 2009/0241091 | A1 * | 9/2009 | Anlauff et al. | 717/114 |
| 2010/0077351 | A1 * | 3/2010 | Kaulgud et al. | 715/810 |
| 2013/0007701 | A1 * | 1/2013 | Sundararam | 717/109 |

OTHER PUBLICATIONS

Canfora, Gerardo, et al. "An extensible system for source code analysis."Software Engineering, IEEE Transactions on 24.9 (1998): 721-740.*

Kamiya, Toshihiro, Shinji Kusumoto, and Katsuro Inoue. "CCFinder: a multilinguistic token-based code clone detection system for large scale source code." Software Engineering, IEEE Transactions on 28.7 (2002): 654-670.*

Van Deursen, Arie, and Tobias Kuipers. "Identifying objects using cluster and concept analysis." Proceedings of the 21st international conference on Software engineering. ACM, 1999.*

Marat Boshernitsan Marat, Susan L. Graham and Marti A. Hearst "Aligning Development Tools with the Way Programmers Think About Code Changes", Date: Apr. 28-May 3, 2007, pp. 1-10.

Bertjan Broeksema, "A Visual Tool-Based Approach to Porting C++Code.", Date: Jun. 2010 , pp. 1-127.

(Continued)

*Primary Examiner* — Don Wong
*Assistant Examiner* — Hossain Morshed
(74) *Attorney, Agent, or Firm* — Narendra Reddy Thappeta

(57) ABSTRACT

An aspect of the present invention facilitates analysis of software code written in a programming language. In one embodiment, a visual interface designed to receive values identifying constructs of the programming language is provided on a display unit. In response to receiving, from a user using the visual interface, values corresponding to a construct of interest, a rule indicating a string of characters (that would constitute the construct of interest) is generated based on the received values. The generated rule is then applied to the software code to identify blocks matching the string of characters, each block representing a corresponding occurrence of the construct of interest in the software code.

20 Claims, 10 Drawing Sheets

(56) References Cited

OTHER PUBLICATIONS

"XSLT Max", "http://www.maxeam.com/xslt.html", Downloaded Circa Dated: Jun. 16, 2011, p. 1.
"XML to XML mapping editor", "http://publib.boulder.ibm.com/infocenter/dmndhelp/v6rxmx/index.jsp?topic=/com.ibm.etools.mapping.xmxeditor.doc/topics/cxmlmap.html", Downloaded Circa Dated: Jun. 16, 2011, p. 1.
"Eswaran Narasimhan and Udayan Banerjee" "Software Visualization Tool to Support for Outsourced Software Maintenance", "http://myais.fsktm.um.edu.my/1492/" , Dated; 2007—Australian Conference on Software Engineering, Melbourne, Australia, pp. 1-6.
"Generic Code Comprehension and Transformation Tool", "http://dl.acm.org/citation.cfm?id=1249255" , Dated; 2007—International Conference on Informatics, Malaysia, pp. 1-8.

* cited by examiner

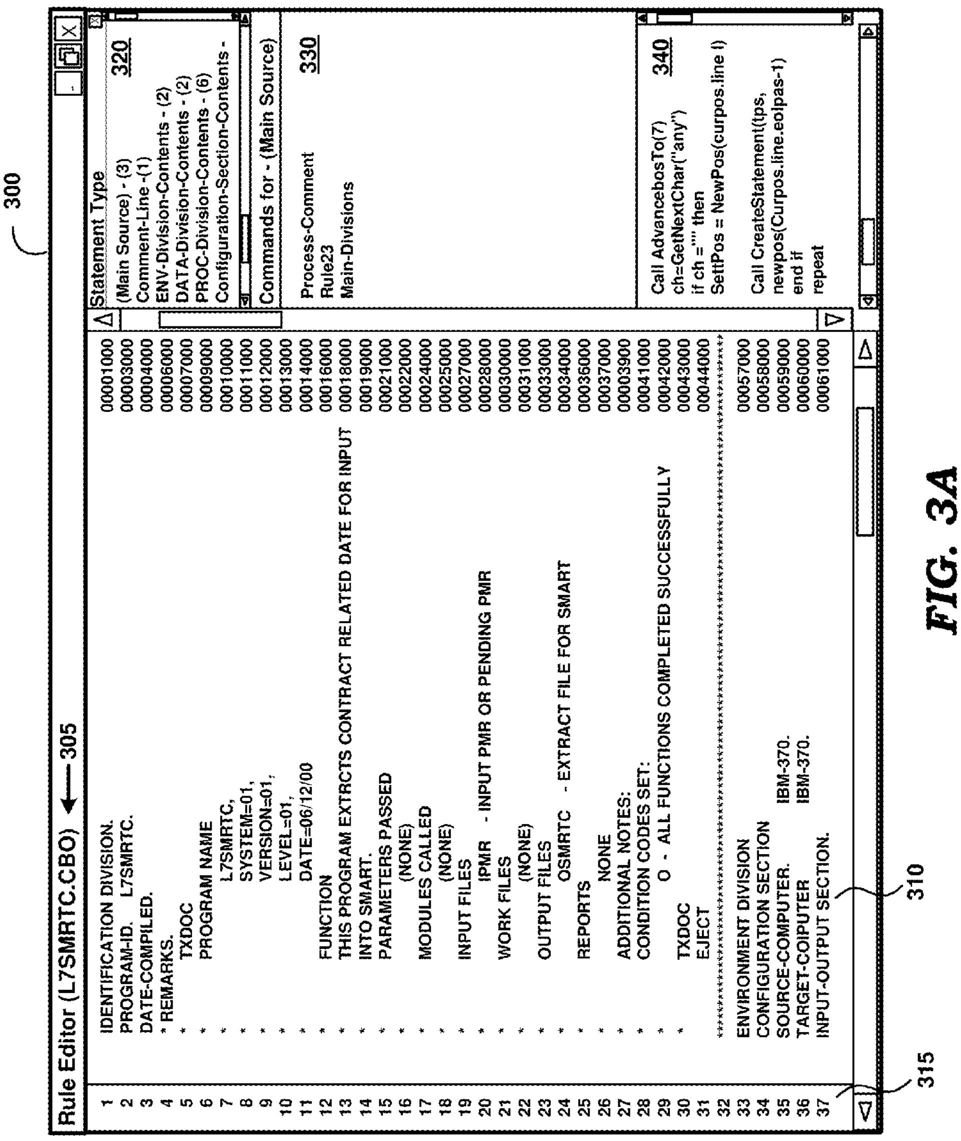

FIG. 3A

Rule Editor (L7SMRTC.CBO) — 305

| Line | Code | Statement Type |
|---|---|---|
| 1 | | IDENTIFICATION DIVISION. |
| 2 | 00001000 | (Main Source) - (3) |
| 3 | 00003000 | Comment-Line -(1) |
| 4 | 00004000 | ENV-Division-Contents - (2) |
| 5 | 00006000 | DATA-Division-Contents - (2) |
| 6 | 00007000 | PROC-Division-Contents - (6) |
| 7 | 00009000 | Configuration-Section-Contents - |
| 8 | 00010000 | |
| 9 | 00011000 | |
| 10 | 00012000 | Commands for - (Main Source) |
| 11 | 00013000 | |
| 12 | 00014000 | Process-Comment |
| 13 | 00016000 | Rule23 |
| 14 | 00018000 | Main-Divisions |
| 15 | 00019000 | |

320, 330, 340

Commands:
- Call AdvanceEbosTo(7)
- ch=GetNextChar("any")
- if ch = "" then
- SetltPos = NewPos(curpos.line l)
- Call CreateStatement(tps, newpos(Curpos.line.eolpas-1)
- end if
- repeat Source listing:
- IDENTIFICATION DIVISION.
- PROGRAM-ID. L7SMRTC.
- DATE-COMPILED.
- * REMARKS.
- * TXDOC
- * PROGRAM NAME
- * L7SMRTC,
- * SYSTEM=01,
- * VERSION=01,
- * LEVEL=01,
- * DATE=06/12/00
- * FUNCTION
- * THIS PROGRAM EXTRCTS CONTRACT RELATED DATE FOR INPUT
- * INTO SMART.
- * PARAMETERS PASSED
- * (NONE)
- * MODULES CALLED
- * (NONE)
- * INPUT FILES
- * IPMR - INPUT PMR OR PENDING PMR
- * WORK FILES
- * (NONE)
- * OUTPUT FILES
- * OSMRTC - EXTRACT FILE FOR SMART
- * REPORTS
- * NONE
- * ADDITIONAL NOTES:
- * CONDITION CODES SET:
- * O - ALL FUNCTIONS COMPLETED SUCCESSFULLY
- * TXDOC
- EJECT
- ENVIRONMENT DIVISION
- CONFIGURATION SECTION
- SOURCE-COMPUTER. IBM-370.
- TARGET-COIPUTER IBM-370.
- INPUT-OUTPUT SECTION.

310, 315

```xml
<source>
<statement name="ID-Divsion" format="" start-line=" 1" start-pos=" 8" end-line=" 56" end-pos=" 80" start-limit=" 8" end-limit=" 72" >
    <token name="IDENTIFICATION DIVISION." start-line=" 1" start-pos=" 8"
        end-line=" 1" end-pos=" 31" category=" 16711680" />
    <statement name="ID-Divsion-Contents" format="" start-line=" 1" start-pos=" 32" end-line=" 56" end-pos=" 80" >
        <statement name="Comment-Line" format="" start-line=" 6" start-pos=" 1" end-line=" 6" end-pos=" 80" >
            <attribute name="Comment" text="      *REMARKS.                                                                  00006000"
                start-line=" 6" start-pos=" 1" end-line=" 6" end-pos=" 80" category=" 3937500" />
        </statement>
        <statement name="Comment-Line" format="" start-line=" 7" start-pos=" 1" end-line=" 7" end-pos=" 80" >
            <attribute name="Comment" text="      *      TXDOC                                                              00007000"
                start-line=" 7" start-pos=" 1" end-line=" 7" end-pos=" 80" category=" 3937500" />
        </statement>
        <statement name="Comment-Line" format="" start-line=" 9" start-pos=" 1" end-line=" 9" end-pos=" 80" >
            <attribute name="Comment" text="      *      PROGRAM NAME                                                       00009000"
                start-line=" 9" start-pos=" 1" end-line=" 9" end-pos=" 80" category=" 3937500" />
        </statement>
        <statement name="Comment-Line" format="" start-line=" 10" start-pos=" 1" end-line=" 10" end-pos=" 80" >
            <attribute name="Comment" text="      *      L7SMRTC,                                                           00010000"
                start-line=" 10" start-pos=" 1" end-line=" 10" end-pos=" 80" category=" 3937500" />
        </statement>
        <statement name="Comment-Line" format="" start-line=" 11" start-pos=" 1" end-line=" 11" end-pos=" 80" >
            <attribute name="Comment" text="      *      SYSTEM=01,                                                         00011000"
                start-line=" 11" start-pos=" 1" end-line=" 11" end-pos=" 80" category=" 3937500" />
        </statement>
        ...
    </statement>
</statement>
</source>
```

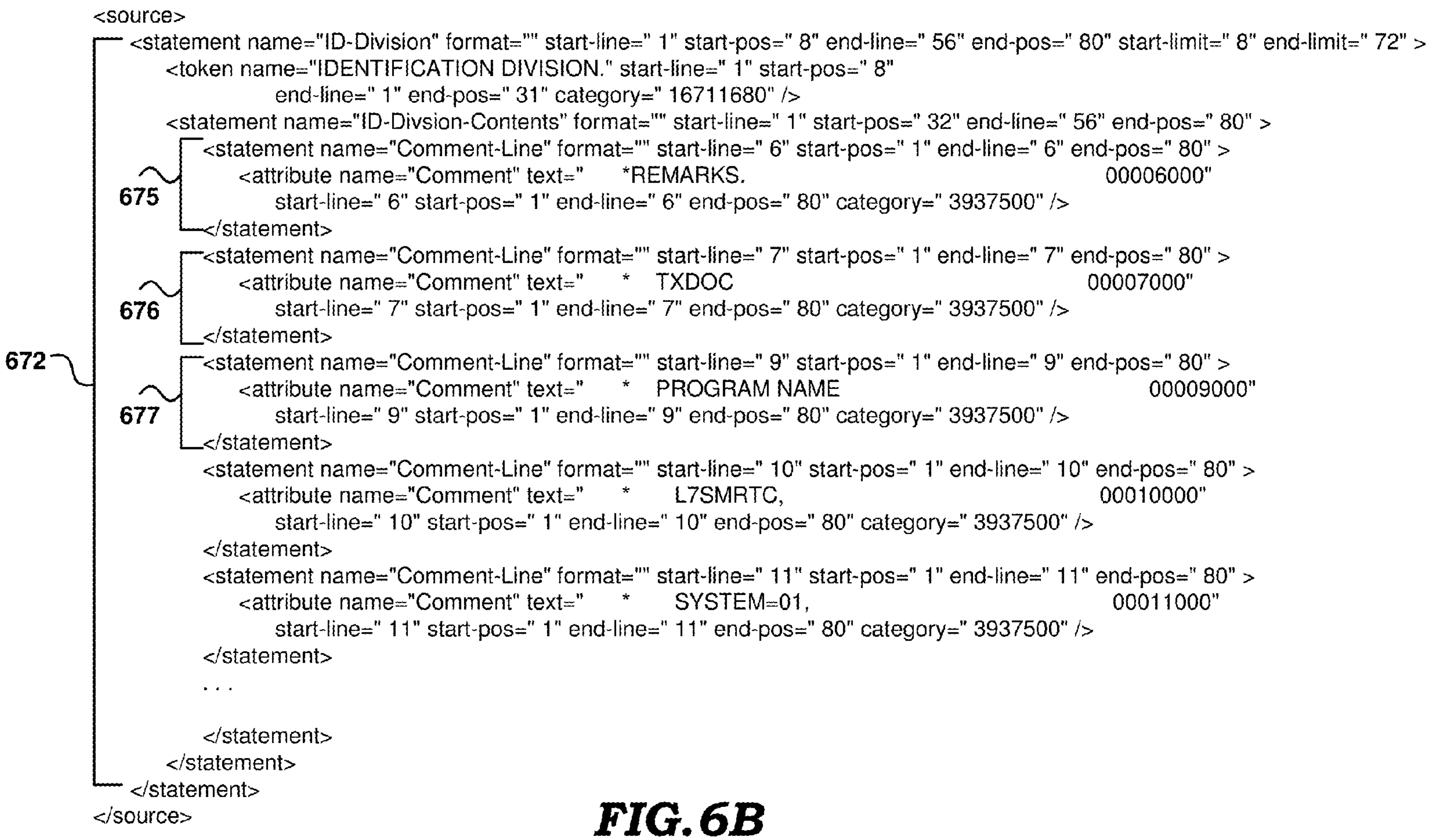

FIG.6B

SIMPLIFYING ANALYSIS OF SOFTWARE CODE USED IN SOFTWARE SYSTEMS

BACKGROUND OF THE INVENTION

1. Technical Field

The present disclosure relates to software systems, and more specifically to simplifying analysis of software code used in (the) software systems.

2. Related Art

Source code refers to the human readable representation (such as text, visual elements, etc.) of the programming logic implemented in a software system. Such human readable representation is generally specified in the form of one or more instructions according to a programming language (that can be understood at least by humans).

However, there are several scenarios in which such human readable representation may not be adequate for comprehending (i.e., understanding the programming logic implemented in) the software code. For example, the software code may be implemented using outdated or obsolete technologies (operating systems, programming languages, etc.) such as in legacy systems, the number of instructions/lines of code in the software code may be very large (e.g., more than 10,000), and/or there may be lack of documentation supporting the software code. In such scenarios, the comprehension of the software code often necessitates (manual or programmatic) inspection and review of the instructions constituting the software code.

There is accordingly a general need to simplify the analysis (inspection and review) of the software code used in software systems.

BRIEF DESCRIPTION OF THE DRAWINGS

Example embodiments of the present invention will be described with reference to the accompanying drawings briefly described below.

FIG. 3A depicts the manner in which developers are facilitated to view analysis rules in one embodiment.

FIG. 6B depicts portions of data indicating the manner in which blocks identified in a software code (based on analysis rules) is stored in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

Figure 1:
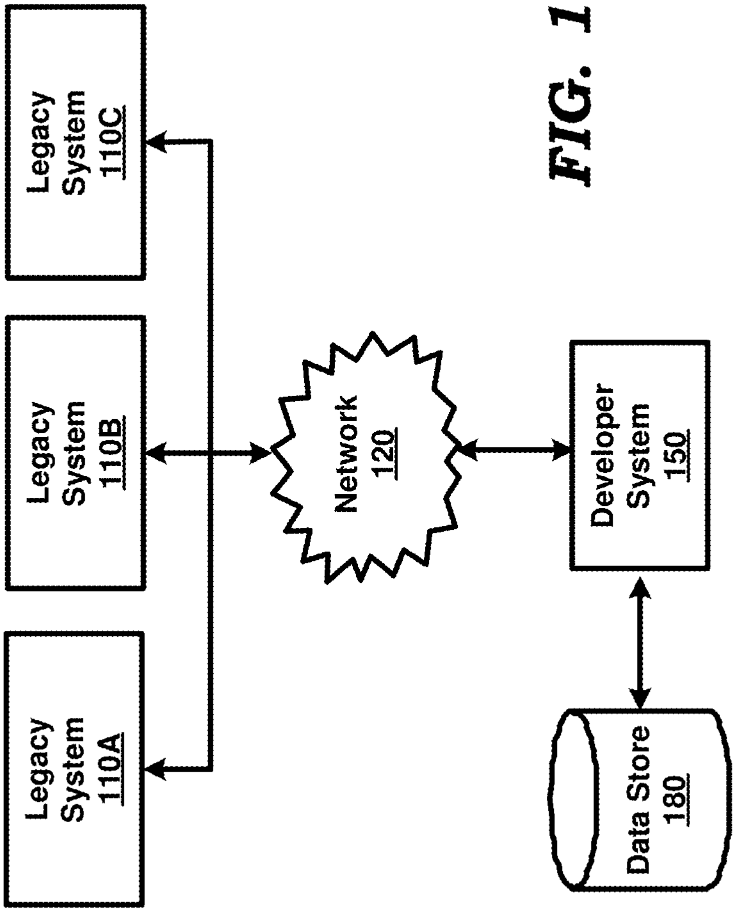
FIG. 1 is a block diagram illustrating an example environment (computing system) in which several aspects of the present invention can be implemented.

An aspect of the present invention facilitates analysis of software code written in a programming language. In one embodiment, a visual interface designed to receive values identifying constructs of the programming language is provided on a display unit. In response to receiving, from a user using the visual interface, values corresponding to a construct of interest, a (analysis) rule indicating a string of characters (that would constitute the construct of interest) is generated based on the received values. The generated rule is then applied to the software code to identify blocks matching the string of characters, each block representing a corresponding occurrence of the construct of interest in the software code.

Another aspect of present invention facilitates the user to specify a value indicating a position from the beginning of each line (in the software code) from where the string of characters (in the first rule) is to be matched. The blocks are accordingly identified only if the blocks match the string of characters starting at the position in each of the lines in the software code.

One more aspect of the present invention enables a user to indicate that a second rule is to be applied only to the blocks identified (in the source code) based on a first rule. In response to such an indication, the second rule is applied to the source code to determine the sub blocks of the identified blocks that match (the string of characters indicated by) the second rule. In one embodiment, the user first specifies a name to be associated with the blocks identified by applying the first rule, and then specifies the second rule to be applied to only the blocks associated with the specified name.

Yet another aspect of the present invention facilitates rules to indicate a corresponding display format in which the matched blocks are to be displayed. The software code is first displayed a default display format, and in response to identifying a first set of blocks based on a first rule, the first set of blocks are displayed in a first display format specified by the first rule. In response to determining a second set of blocks based on a second rule, the second set of blocks are displayed in a second format specified by the second rule. Accordingly, a user is enabled to view the effect of applying the first rule to the software code before viewing the effect of applying the second rule to the software code.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing legacy systems 110A-110C, network 120, developer system 150, and data store 180.

Merely for illustration, only representative number/type of systems is shown in FIG. 1. Many environments often contain many more systems, both in number and type, depending on the purpose for which the environment is designed. Each system/device of FIG. 1 is described below in further detail.

Network 120 provides connectivity between legacy systems 110A-110C, and developer system 150 and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by network 120. When the packet contains content such as port numbers, which specifies the target application, the packet may be said to be directed to such application as well Data store 180 represents a non-volatile (persistent) storage facilitating storage and retrieval of a collection of data (such as portions of software codes, result of analysis of the software codes, etc.) by applications executing in developer system 150. Data store 180 may be implemented as a corresponding database server using relational database technologies and accordingly provide storage and retrieval of data using structured queries such as SQL (Structured Query Language). Alternatively, data store 180 may be implemented as a corresponding file server providing storage and retrieval of data in the form of files organized as one or more directories, as is well known in the relevant arts.

Each of legacy systems 110-110C represents a server system such as a web/application server, mainframe, etc. implemented using outdated or obsolete technologies (such as operating environment, programming language, etc.), but which are still maintained and used on a regular basis. Each legacy system may have been used (and also optimized) over a long duration to become a critical part of the working of large business entities, thereby necessitating their continued usage. Each legacy system may use/execute a corresponding software code implemented using outdated/obsolete programming languages such as assembly level languages, PL/1, COBOL, FORTRAN, etc. (hereafter "older programming languages").

It may be appreciated that users/developers may wish to comprehend (understand the programming logic implemented in) the software codes used in legacy system 110A-110C. For example, it may be desirable that the software code (such as applications) used in a legacy system (110A) be migrated to (converted to corresponding code in) "newer" technologies for improving the speed of execution, interoperability with other technologies, and availability of personnel with the relevant skill sets. As noted in the Background section, the developers may be required to perform analysis of the software code used in a legacy system to understand the implemented programming logic.

Developer system 150, provided according to several aspects of the present invention, represents a system such as a personal computer, workstation, mobile device, etc. which simplifies the analysis of software code used in software systems (such as legacy system 110A). The manner in which developer system 150 may simplify the analysis of software code is described below with examples.

3. Simplifying Analysis of Software Code

Figure 2:
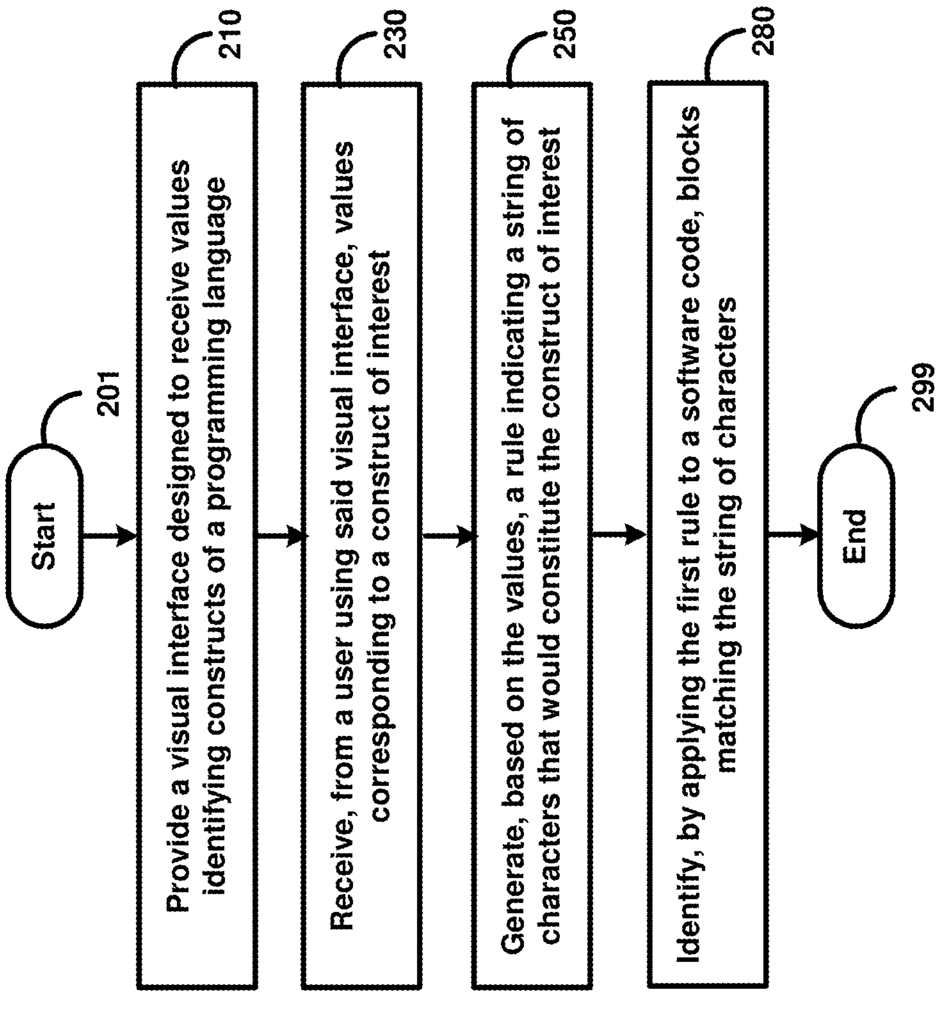
FIG. 2 is a flow chart illustrating the manner in which analysis of software code used in legacy systems is simplified according to an aspect of the present invention.

FIG. 2 is a flow chart illustrating the manner in which analysis of software code used in legacy systems is simplified according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, developer system 150 provides a visual interface designed to receive values identifying constructs of a (older) programming language in which software code (sought to be analyzed) is implemented. The visual interface may be provided in a display unit associated with developer system 150 (not shown in FIG. 1). The visual interface may be provided in any convenient form.

In general, a programming language defines various tokens (sequence of characters) and constructs that are valid and processed by an interpreter/compiler of the programming language. Each construct defines a corresponding one or more ordered combinations in which a set of valid tokens are to be specified in the software code. For example, a conditional construct may define ordered combinations such as "IF <lexp> THEN <stmts> ENDIF" and "IF <lexp> THEN <stmts> ELSE <stmts> ENDIF", where "IF", "THEN", "ELSE" and "ENDIF" are pre-defined tokens/sequences of characters known as keywords, <lexp> is a valid logical expression (that results in a true or false value), and <stmts> is a set of valid statements/constructs. In the disclosure herein, the term "constructs" is used to refer to the valid tokens in addition to the ordered combinations defined in a programming language.

In step 230, developer system 150 receives, from a user/developer using the provided visual interface, values corresponding to a construct of interest (as defined by the older programming language). The values generally indicate the characters that may form part of or delimit the token and/or construct of interest. For example, a user may specify a value such as "*" to indicate the character/token that starts a comment (construct of interest) in the older programming language.

In step 250, developer system 150 generates, based on the values, a (analysis) rule indicating a string of characters that would constitute the construct of interest (according to the grammar/definition of the programming language in which the source code is written). For example, in response to the values noted in the above example, the generated rule may indicate that any string of characters starting with a "*" and up to the end of line (EOL) character in the software code forms a comment.

It may be appreciated that the steps of 230 and 250 may be performed in a loop to generate a corresponding set of rules (based on the values received) to be applied to the software code (sought to be analyzed). The generated set of rules may then be stored (for example, in data store 180) and later applied to the software code, as described below.

In step 280, developer system 150 identifies, by applying the generated rule to the software code, blocks matching the string of characters. Each block contains a sequence of characters and represents a corresponding occurrence of the construct of interest in the software code. In the above noted example, the matching blocks represents the occurrences of comments in the software code. Developer system 150 may then store data representing the identified blocks in data store 180 (to facilitate further processing). The flow chart ends in step 299.

Thus, by a providing a visual interface to developers and generating rules based on the values specified in the visual interface, the specification of the (analysis) rule and thereby the analysis of software code used in software systems is simplified. The manner in which developer system 150 simplifies the analysis of software code is described below with examples.

4. Illustrative Example

FIGS. 3A-3B, 4A-4D, 5 and 6A-6B together illustrate the manner in which analysis of software code used in legacy systems is simplified in one embodiment. Each of the Figures is described in detail below.

The description is continued assuming that the software code (sought to be analyzed) is implemented in COBOL programming language. However, the features of the present invention may be applied to other programming languages as well, as will be apparent to one skilled in the relevant arts by reading the disclosure herein.

FIG. 3A depicts the manner in which developers are facilitated to view analysis rules in one embodiment. Display area 300 (and also each of display areas 350, 400, and 450) represents a portion of a user interface displayed on a display unit (not shown) associated with developer system 150.

Display area 310 displays portions of the software code, in particular, a portion of a code file "L7SMRTC.CBO" (as indicated by text 305) selected by the developer. Display area 315 indicates a line number associated with each line in the software code (as identified by the EOL characters in the source code). It should be noted that the line number shown in display area 315 is not part of the code portion shown in display area 310.

Display area 320 displays the statement types specified by the generated analysis rules. Each statement type commonly represents a block/construct in the (older) programming language associated with a corresponding name. Thus, each of "Comment-Line", "ENV-Division-Comments", etc. shown in display area 320 represents a corresponding block/construct specified by a (analysis) rule. The statement type "(Main Source)" is a pre-defined type (not specified by a rule) representing all the instructions in the code file.

Display area 330 displays the list of rules specified for a statement type (selected in display area 320). Accordingly, display area 330 is shown displaying the names of the analysis rules specified for "(Main Source)" statement type selected in display area 320. Display area 340 displays the commands (according to the rule command language) constituting the analysis rule selected in display area 330. Accordingly, display area 340 is shown displaying the commands of the analysis rule named "Process-Comment" selected in display area 330. Thus, a developer is facilitated to view the analysis rules specified for a legacy code (120).

An aspect of the present invention facilitates the developer to specify the analysis rules in an iterative manner. In one embodiment, the developer first defines a first analysis rule specifying a first format and then indicates that the first analysis rule is to be applied to the code file shown in display area 310. Analysis tool 130 accordingly applies the first analysis rule to the code file and updates display area 310 to show the matching blocks identified in the source code according to the specified first format. The developer may similarly specify further analysis rules and view the effect of applying the analysis rules in an iterative manner. The manner in which a developer may specify analysis rules is described below with examples.

Figure 3B:
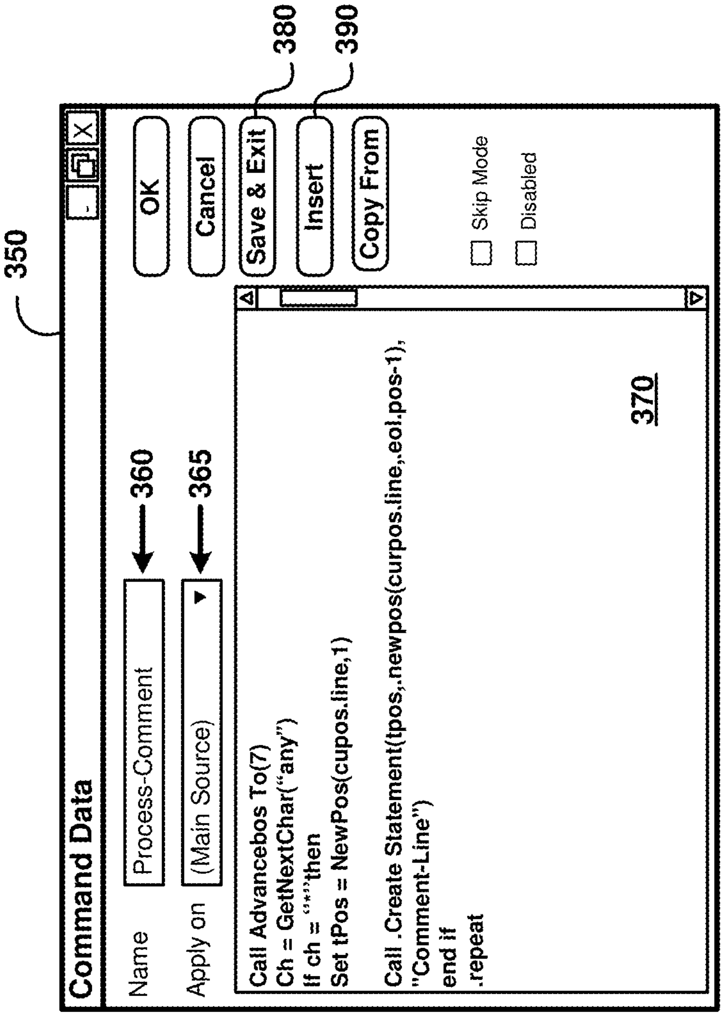
FIG. 3B illustrates the manner in which developers are facilitated to create new analysis rules in one embodiment.

FIG. 3B illustrates the manner in which developers are facilitated to create new analysis rules in one embodiment. Display area 350 represents a portion of a user interface displayed in response to a user selecting "Create Rule" option in a context menu (not shown) provided in the interface of FIG. 3A. The context menu may be provided in response to the user clicking the right mouse button in any of display areas 310, 320, 330 or 340 of FIG. 3A. In one embodiment, display area 350 is displayed as a pop-up window overlaying display area 300.

Text field 360 enables a user to specify a name "Process-Comment" for the analysis rule (to be created), while select field 365 enables the user to specify the statement type/named block "(Main Source)" to which the created analysis rule is to be applied. Text field 370 enables the user to (manually) specify the commands (according to the rule command language) forming the new analysis rule. In response to the developer clicking "Save & Exit" button 380, the commands specified in text field 370 is stored in analysis rules 140 associated with the name specified in text 360 and the statement type specified in select field 365.

It may be observed that the name of the analysis rule is different from the statement type. While the name of the analysis rule "Process-Comment" is specified by the developer, the statement types/named blocks are created by the command ".CreateStatement" in the rule, with the last parameter of the command specifying the name "Command-Line" of the statement type. Thus, display area 320 of FIG. 3A indicates the statement type "Command-Line", while display area 330 there indicates the name of the rule "Process-Comment" to be applied to the "(Main Source)" block.

It may be appreciated that by allowing a developer to indicate the specific statement type/named block to which an analysis rule is to be applied, the developer is facilitated to specify (in any order) a hierarchy of statement types/named blocks. Thus, a developer may first specify a first level of blocks (for example, comments) and then specify a super block (for example, a "division" statement in COBOL) at a higher level in the hierarchy containing the first level of blocks. Alternatively, the developer may also specify sub-blocks at a lower level in the hierarchy by creating analysis rules associated with the first level statement type (using select filed 365 as described above).

Thus, a developer is facilitated to create new analysis rules for comprehension of the software code used in software systems (such as legacy system 110A). It should be noted that the user interface of FIG. 3B enables the developer to manually specify the commands forming the analysis rules. As noted above, developer system 150 simplifies the specification of the analysis rules as described below with examples.

5. Simplifying Specification of Analysis Rules

Figure 4A:
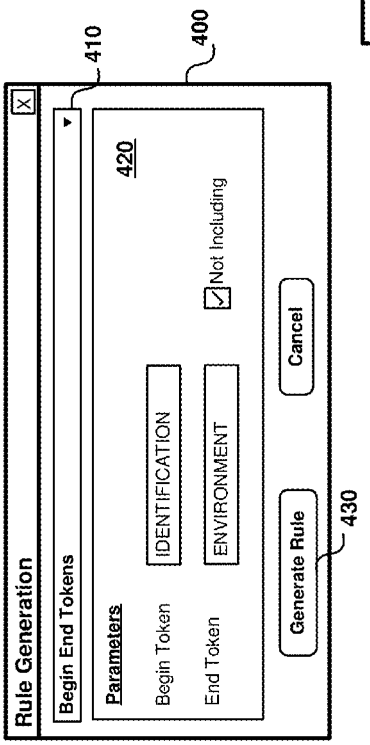
FIGS. 4A and 4B together depict the manner in which specification of an analysis rule is simplified in one embodiment.
Figure 4B:
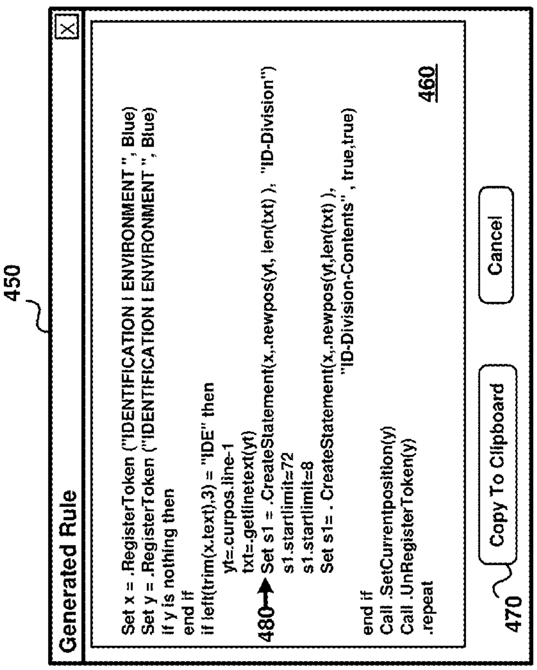

FIGS. 4A and 4B together depict the manner in which specification of an analysis rule is simplified in one embodiment. Referring to the visual interface of FIG. 4A, display area 400 represents a portion of a user interface displayed in response to a user selecting "Insert" button 390 in display area 350. In one embodiment, display area 400 is displayed as a pop-up window overlaying display area 350 (and also display area 300).

Select field 410 enables a user to select a type (such as "Begin End Tokens", Begin End of Line, Literal, etc.) of construct of interest for which a rule is to be generated. In response to the developer selecting a desired type (such as "Begin End Tokens") in select field 410, display area 420 displays the parameters required for the selected type such as "Begin Token", "End Token" and "Not including" (to indicate whether the identified block matching the rule includes or excludes the end token). The developer then specifies desired values such as “IDENTIFICATION”, “ENVIRONMENT”, and selection of checkbox for each of the parameters and then clicks “Generate Rule” button 430 to generate analysis rule corresponding to the selected value for the type and also the values specified for the parameters.

Referring to FIG. 4B, display area 450 represents a portion of a user interface displayed in response to a developer clicking “Generate Rule” button 430 in display area 400. Display area 460 displays the rule generated corresponding to the values of the parameters specified in display area 420.

In the generated rule shown in FIG. 4B, the variables x and y are set to the respective location (line number an position) of the begin token “IDENTIFICATION” and end token “ENVIRONMENT” in the software code. The variable yt is then set to the line previous to the line in which the end token is found (as the “currpos” variable is assumed to be currently positions after the end token), while the “txt” variable is set to the text in the previous line. Thus, text 480 creates a new statement type/block named “ID-Division” (the third parameter) starting from the location of the begin token (by passing the value of x as the first parameter) and ending at the location before the end token (as indicated by the pair of yt and length function of txt). Text 480 may accordingly be viewed as indicating that the string of characters starting from the token “IDENTIFICATION” to the beginning of (and not including) the token “ENVIRONMENT” are to be identified as a block/statement named “ID-Division”.

The developer may select “Copy to Clipboard” button 470 to copy the text shown in display area 460 to the clip board, thereby enabling the developer to paste the copied text in text field 370 and specify a new analysis rule (for identifying the Identification Division statement in COBOL source code). It should be noted that the developer is not required to manually input the commands forming the analysis rule in text field 370. In alternative embodiments, text field 370 may be automatically populated with the text in display area 460 in response to the user selecting button 470, further simplifying specification of the analysis rules.

Figure 4D:
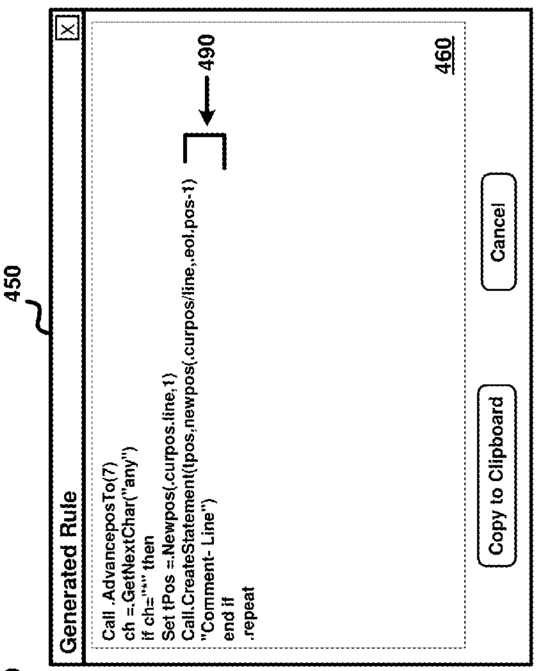
FIGS. 4C and 4D together depict the manner in which specification of another analysis rule is simplified in one embodiment.
Figure 4C:
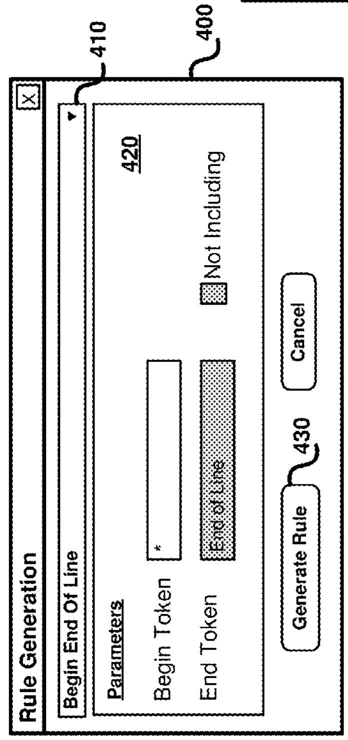

FIGS. 4C and 4D together depict the manner in which specification of another analysis rule is simplified in one embodiment. Referring to the visual interface of FIG. 4C, select field 410 indicates that the developer has selected another type of construct “Begin End Of Line”, and accordingly the corresponding parameters (similar to those for the “Begin End Tokens” type) are shown displayed in display area 420. The end token parameter is shown pre-filled with the “End of Line” token, and also grayed out (along with the checkbox) to indicate that they cannot be changed by the user/developer.

Referring to FIG. 4D, display area 460 is shown displaying the analysis rule generated corresponding to the values (such as “*”) specified by the developer in display area 420 of FIG. 4C. The rule may be generated in response to the developer selecting button 430 in FIG. 4C. It may be observed that text 490 indicates that the string of characters starting from “*” to the end of line is to be identified as the block/statement named “Comment-Line”. It should be appreciated that the comment block is a sub-block of the identification division block specified using the visual interface of FIG. 4A.

Thus, developer system 150 simplifies the specification of analysis rule by first providing the visual interfaces of FIGS. 4A and 4C and then generating corresponding analysis rules based on the values received using the visual interfaces. It may be appreciated that specification of the values corresponding to the parameters may be implemented in any convenient form. An example alternative implementation for specifying the values identifying the constructs is described below with examples.

Figure 5:
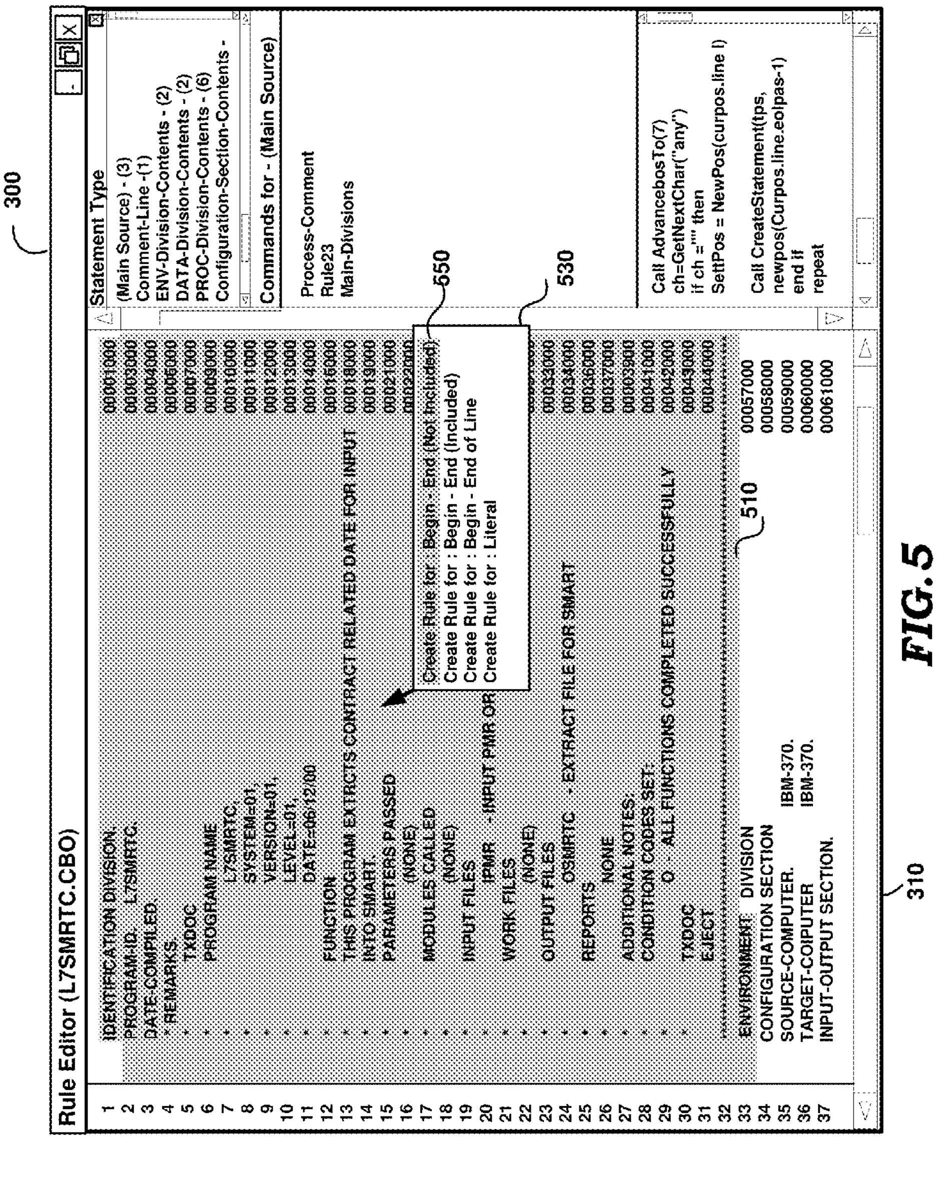
FIG. 5 depicts an alternative manner in which specification of an analysis rule is simplified in one embodiment.

FIG. 5 depicts an alternative manner in which specification of an analysis rule is simplified in one embodiment. The specification of the values (based on which the analysis rule is generated) is performed in the user interface of FIG. 3A, in particular, in display area 310 where the portions of the code file selected by the developer is displayed.

A developer first selects the desired portion of the source code (portion 510 shown in gray background) that is to be identified as a named block, and then clicks on the right mouse button to cause context menu 530 to be displayed. In one embodiment, context menu 530 is shown displaying the different types of constructs for which the rules can be generated (with different options provided as separate selections). In alternative embodiments, the type of construct for which the rule is to be generated may be inferred from the selected potion of the source code (for example, the “Begin End Of Line” type from the selection of a single line in display area 310), and only the appropriate type may be provided in context menu 530.

In response to the developer selecting “Begin End Tokens (Not Included)” 550, developer system 150 determines that the begin token and the end token is respectively the first token “IDENTIFICATION” and the last token “ENVIRONMENT” in the selected portion 510. Since the “Not included” option has been selected, developer system 150 generates the analysis rule shown in display area 460 of FIG. 4B. Other rules may be similarly generated based on corresponding portions selected in display area 310.

Thus, developer system 150 simplifies the analysis of software code used in software systems. The manner in which developer system 150 may be implemented in one embodiment is described below with examples.

6. Example Implementation

Figure 6A:
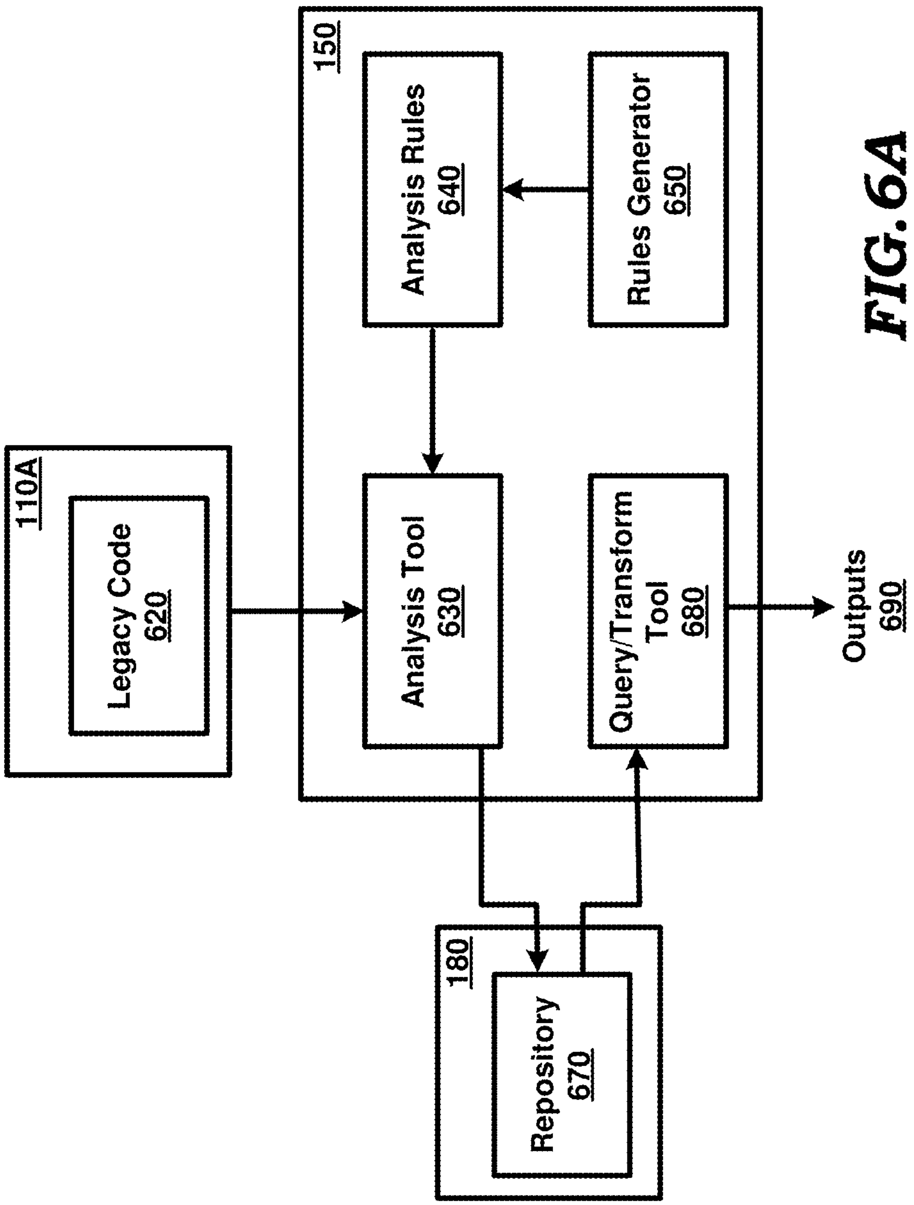
FIG. 6A is a block diagram illustrating the implementation of a developer system in one embodiment.

FIG. 6A is a block diagram illustrating the implementation of developer system 150 in one embodiment. The block diagram is shown containing legacy code 620 (in legacy system 110A), repository 670 (in data store 180), analysis tool 630, analysis rules 640, rules generator 650, and query/transform tool 680 (all shown in developer system 150). Each of the blocks I described in detail below.

Legacy code 620 represents a collection of software applications implemented in legacy system 110A. Legacy code 620 contains software instructions written in one or more of the outdated/obsolete programming languages noted above. Display area 310 of FIG. 3A is assumed to be showing a portion of legacy code 620 implemented in COBOL.

It may be desirable that legacy code 620 be migrated to newer technologies. However, the large number of instructions in legacy code 620 and/or the lack of documentation may force the user/developer to perform the analysis of the instructions constituting legacy code 620 to better comprehend/understand the programming logic implemented in legacy code 620.

Analysis tool 630 (executing in developer system 150) is designed to analyze the structure of legacy code 620. Analysis tool 630 may accordingly include a lexical analyzer designed to convert the sequence of characters in legacy code 620 to a sequence of tokens based on the presence of space character, the tab character, end of line (EOL) character, etc. Analysis tool 630 may also include a parser that determines the grammatical structure of the tokens based on the grammar/definition of the programming language in which legacy code 620 is implemented.

Analysis tool 630 may display the different identified /constructs in corresponding different formats (for example, in different colors, as bold, as underlined, etc.) on a display unit (not shown) associated with developer system 150, thereby facilitating developers to better understand the programming logic implemented in legacy code 620.

In one embodiment, analysis tool 630 is implemented to parse all the constructs (typically in the range 100-250 constructs) of the older programming language. Such a requirement places a limitation on the number of older programming languages that can be parsed by analysis tool 630. Furthermore, there are several scenarios in which such parsing and identification of all the constructs of the programming language is not necessary. For example, in the scenario that the developer wishes to merely identify the dependencies among the code files, analysis tool 630 may need to only identify the keywords/constructs in the programming languages that specify dependencies.

In an alternative embodiment, a developer is facilitated (using a user interface) to specify various analysis rules (640) for identifying the various constructs of interest. Each rule in analysis rules 640 specifies a corresponding construct and/or pattern that the developer wishes to identify in legacy code 620. Though not shown, analysis rules 640 may be maintained in a non-volatile storage (such as a hard disk) in developer system 150. Analysis tool 630 is accordingly designed to identify only the constructs and/or patterns in legacy code 620 that matches/satisfies the rules in analysis rules 640.

Rules generator 650, provided according to several aspects of the present invention, simplifies the specification of analysis rule 640. Thus, rules generator 650, in response to the values specified by the developer in FIGS. 4A/4C, generates corresponding rules (as shown in the respective interfaces of FIGS. 4B/4D) based on the specified values. Rules generator 650 may generate the analysis rules according to a rule command language understood by analysis tool 630, and may then store the generated rules as part of analysis rules 640.

It may be appreciated that the rules may also be generated based on the specific programming language sought to be analyzed. Thus for the same values provided by the developer (in FIGS. 4A/4C), rules generator 650 may generate one set of commands for a programming language, and a different set of commands for a different programming language. Such difference in commands may be based on the definition of the programming language, for example, a column/position based language in comparison to a free-form language.

For example, it may be observed in the generated rule shown in text field 460 of FIG. 4D, the first command "Call .AdvanceposTo(7)" indicates that the begin token "*" starts at position/column 7 from the beginning of each line. Such a command may be included in the generated rule by rules generator 650 as COBOL (the language in which legacy code 620 is written) is a column/position based programming language.

After rules generator 650 generates and stores the analysis rules as part of analysis rules 640, analysis tool 630 identifies blocks matching the stored analysis rules. Analysis tool 630 is also designed to store the constructs identified in legacy code 620 in repository 670 for further processing (in any convenient format).

The description is continued assuming that that the rules for identifying the identification division blocks and comment blocks in COBOL have been generated as illustrated in FIGS. 4B/4D and then stored as part of analysis rules 640. The manner in which the matching identification division/comment blocks are maintained in repository 670 is described below with examples.

FIG. 6B depicts portions of data indicating the manner in which blocks identified in a software code (based on analysis rules) is stored in one embodiment. The portions of the data are stored in repository 670 according extensible markup language (XML).

Data portion 672 specifies the details of the identification division block (as indicated by the name "ID-Division") identified in the portions of source code shown in display area 310. Each of data portions 675-677 specifies the details of a corresponding comment block (as indicated by the name "Comment-Line") identified in the source code show in display area 310. It may be observed that the the "statement" elements of the comment blocks are shown within the "statement" element of the identification division block indicating that the comment blocks are sub-blocks of the identification division block.

Referring back to FIG. 6A, query/transform tool 680 (executing in developer system 150) is designed to process the constructs (of legacy code 620) stored in repository 670 and to determine the response to specific queries based on the stored constructs. Query/transform tool 680 is also designed to generate various reports and/or diagrams (based on the requirements specified by a developer) about legacy code 620. Furthermore, query/transform tool 680 may be designed to receive from a developer a set of transformation rules and to generate corresponding transformations of the stored constructs.

Outputs 690 represent the different responses provided by query/transform tool 680 such as the response to queries, reports, diagrams and the generated transformations. Outputs 690 may include the response to queries such as the number of occurrences of a construct and/or pattern in legacy code 620, the dependencies among the different code files in the legacy code, the overall structure in which the code files are organized, etc. Outputs 690 may include reports such as flow charts (visually depicting the programming logic of the software code), sequence diagrams, etc.

Outputs 690 may also include migrated code generated according to newer technologies. For example, a developer may specify the transformation rules for converting each of the token/construct in an older programming language (in which legacy code 620 is implemented) to a corresponding token/constructs defined in newer programming language such as C, C++, Java, C#, etc (to which the legacy code is to be migrated). Query/transform tool 680 may accordingly generate the instructions in the newer programming language based on the constructs stored in repository 670 and the specified transformation rules, thereby migrating legacy code 620 to a newer technology.

It should be appreciated that the features described above can be implemented in various embodiments as a desired combination of one or more of hardware, executable modules, and firmware. The description is continued with respect to an embodiment in which various features are operative when the software instructions described above are executed.

7. Digital Processing System

Figure 7:
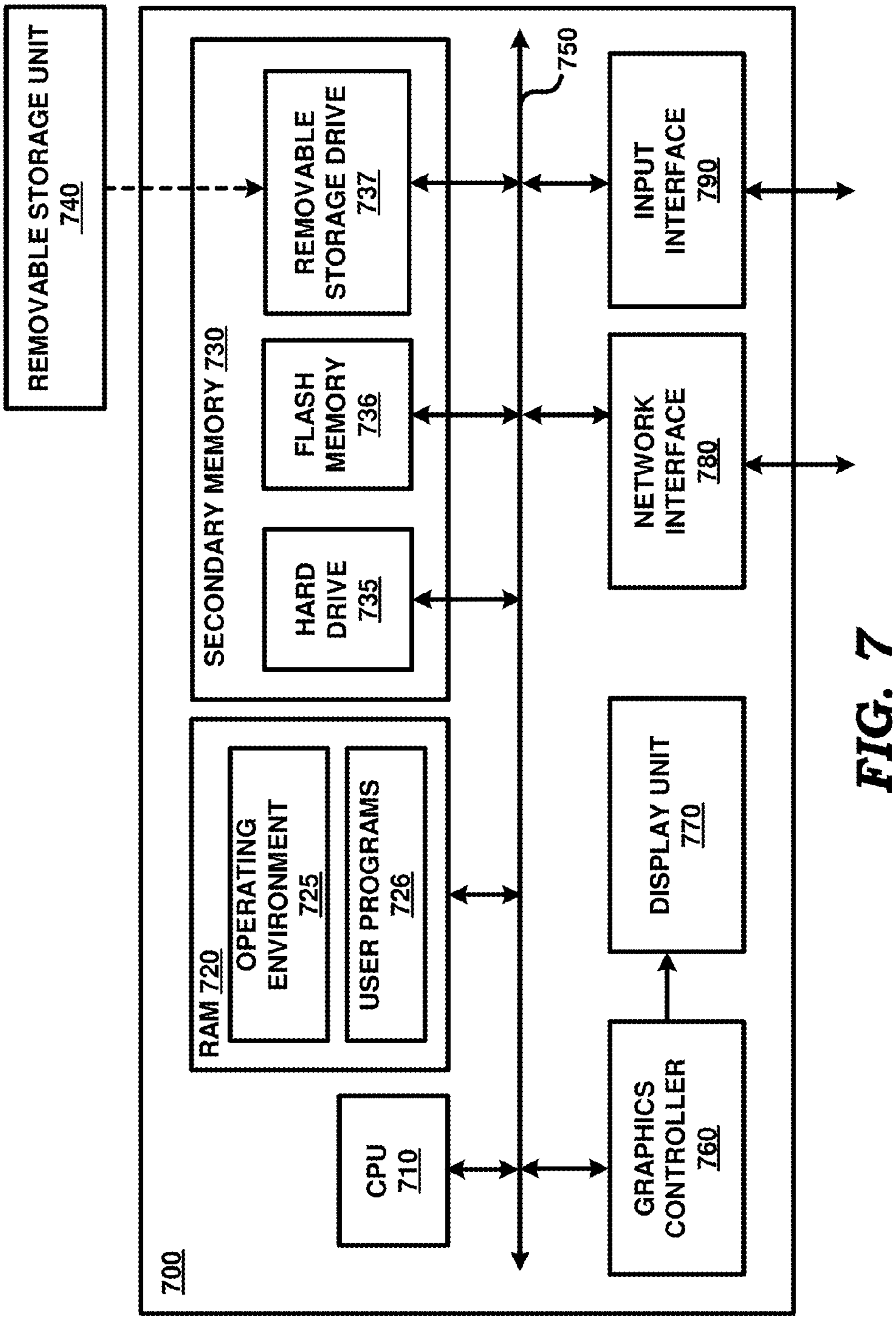
FIG. 7 is a block diagram illustrating the details of a digital processing system in which various aspects of the present invention are operative by execution of appropriate software instructions.

FIG. 7 is a block diagram illustrating the details of digital processing system 700 in which various aspects of the present invention are operative by execution of appropriate software instructions. Digital processing system 700 may correspond to any system (such as developer system 160) executing rules tool 150.

Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or user programs 726 (such as networking applications, database applications, etc.). Shared environment 725 contains utilities shared by user programs, and such shared utilities include operating system, device drivers, virtual machines, flow engine, etc., which provide a (common) run time environment for execution of user programs/applications.

Graphics controller 760 generates display signals (e.g., in RGB format) to display unit 770 based on data/instructions received from CPU 710. Display unit 770 contains a display screen to display the images defined by the display signals (such as the portions of the user interface shown in FIGS. 3A-3B, 4A-4D and 5). Input interface 790 may correspond to a keyboard and a pointing device (e.g., touch-pad, mouse) and may be used to provide the user inputs (such as the values specified in the portions of the user interface shown in FIGS. 3A-3B, 4A-4D and 5) required for several aspects of the present invention. Network interface 780 provides connectivity to a network (e.g., using Internet Protocol), and may be used to communicate with other connected systems (such as user systems 110A-110Z, server systems 160A-160N, etc.) of FIG. 1.

Secondary memory 730 may contain hard drive 735, flash memory 736, and removable storage drive 737. Secondary memory 730 may store the data (for example, portions of the legacy code, portions of the analysis rules, portions of the XML data show in FIG. 6, etc.) and software instructions (for example, for performing the steps of FIG. 2), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of analyzing software code written in a column based programming language defined by a first grammar, said first grammar of said column based programming language specifying a plurality of constructs, each construct being required by said first grammar to start at a pre-specified column position in lines constituting the software code, said method being performed in a digital processing system, said method comprising:

providing, on a display unit, a visual interface designed to receive values identifying constructs of said column based programming language;

receiving, from a user using said visual interface, a first set of values corresponding to a first construct of interest;

generating, based on said first set of values and said first grammar of said column based programming language, a first rule indicating a string of characters that would constitute said first construct of interest, said first rule further indicating a first set of column positions at which lines of said software code are to be examined for the presence of said first construct of interest; and identifying, by applying said first rule to said software code, a first plurality of blocks in said software code, wherein each of said first plurality of blocks including lines matching said string of characters starting at said first set of column positions indicated by said first rule, wherein said first plurality of blocks respectively represent corresponding occurrences of said first construct of interest in said software code, wherein said generating incorporates said first set of column positions in said first rule based on said first grammar of said column based programming language without said user having to specify said first set of column positions.

2. The method of claim 1, wherein said identifying is performed by a parser, wherein said generating generates said first rule to include a first set of instructions for said parser, said first set of instructions being according to a rule command language having a second grammar different than said first grammar of said column based programming language.

3. The method of claim 2, wherein said first set of values includes a first value specifying a type of said first construct of interest, a second value specifying a begin token that indicates the beginning of said first construct of interest, and a third value specifying an end token that indicates the end of said first construct of interest, wherein said generating generates said string of characters to include said begin token and said end token, wherein said parser identifies as said first plurality of blocks, which have lines expressly matching said string of characters including said begin token and said end token received as part of said first set of values from said user.

4. The method of claim 3, wherein said begin token and said end token are specified as a same text implying that said first construct of interest is a literal in said first grammar of said column based programming language, wherein said generating generates said string of characters to include said same text as said begin token and said end token.

5. The method of claim 4, further comprising:

displaying, on said display unit, text constituting lines of said software code;

receiving, from said user, a selection of a portion of said text displayed on said display unit and an indication that a rule is to be generated based on said selection and said type; and determining that said begin token is the first token in said selection and said end token is the last token in said selection, wherein said generating generates said first rule based on the first token, the last token and said type.

6. The method of claim 1, wherein said generating generates a plurality of rules based on values received from said user using said visual interface, said plurality of rules including said first rule and a second rule different from said first rule, said method comprising:

receiving, from said user, an indication that said second rule is to be applied to each of said first plurality of blocks; and determining, by applying said second rule to said software code, a second plurality of blocks matching a second string of characters indicated by said second rule, wherein said second plurality of blocks are sub blocks of corresponding ones of said first plurality of blocks.

7. The method of claim 6, further comprising receiving, from said user, a first name to be associated with blocks identified for said first construct of interest, wherein identifying associates each of said first plurality of blocks to said first name, wherein said indication indicates that said second rule is to be applied to blocks associated with said first name.

8. The method of claim 6, wherein each of said plurality of rules specifies a corresponding display format, said method further comprising:

displaying, on said display unit, said software code in a default display format;

in response to said identifying, displaying said first plurality of blocks in a first display format specified by said first rule; and in response to said determining, displaying said second plurality of blocks in a second display format specified by said second rule, wherein said default display format, said first display format and said second display format are different from each other, whereby said user is enabled to view the effect of applying said first rule to said software code before viewing the effect of applying said second rule to said software code.

9. A non-transitory machine readable medium storing one or more sequences of instructions for causing a system analyze software code written in a column based programming language defined by a first grammar, said first grammar of said column based programming language specifying a plurality of constructs, each construct being required by said first grammar to start at a pre-specified column position in lines constituting the software code, wherein execution of said one or more sequences of instructions by one or more processors contained in said system causes said system to perform the actions of:

providing, on a display unit, a visual interface designed to receive values identifying constructs of said column based programming language;

receiving, from a user using said visual interface, a first set of values corresponding to a first construct of interest;

generating, based on said first set of values and said first grammar of said column based programming, a first rule indicating a string of characters that would constitute said first construct of interest, said first rule further indicating a first set of column positions at which lines of said software code are to be examined for the presence of said first construct of interest; and identifying, by applying said first rule to said software code, a first plurality of blocks in said software code, wherein each of said first plurality of blocks including lines matching said string of characters starting at said first set of column positions indicated by said first rule, wherein said first plurality of blocks respectively represent corresponding occurrences of said first construct of interest in said software code, wherein said generating incorporates said first set of column positions in said first rule based on said first grammar of said column based programming language without said user having to specify said first set of column positions.

10. The machine readable medium of claim 9, wherein said identifying is performed by a parser, wherein said generating generates said first rule to include a first set of instructions for said parser, said first set of instructions being according to a rule command language having a second grammar different than said first grammar of said column based programming language.

11. The machine readable medium of claim 10, wherein said first set of values includes a first value specifying a type of said first construct of interest, a second value specifying a begin token that indicates the beginning of said first construct of interest, and a third value specifying an end token that indicates the end of said first construct of interest, wherein said generating generates said string of characters to include said begin token and said end token, wherein said parser identifies as said first plurality of blocks, which have lines expressly matching said string of characters including said begin token and said end token received as part of said first set of values from said user.

12. The machine readable medium of claim 11, further comprising one or more instructions for:

displaying, on said display unit, text constituting lines of said software code;

receiving, from said user, a selection of a portion of said text displayed on said display unit and an indication that a rule is to be generated based on said selection and said type; and determining that said begin token is the first token in said selection and said end token is the last token in said selection, wherein said generating generates said first rule based on the first token, the last token and said type.

13. The machine readable medium of claim 9, wherein said generating generates a plurality of rules based on values received from said user using said visual interface, said plurality of rules including said first rule and a second rule different from said first rule, further comprising one or more instructions for:

receiving, from said user, an indication that said second rule is to be applied to each of said first plurality of blocks; and determining, by applying said second rule to said software code, a second plurality of blocks matching a second string of characters indicated by said second rule, wherein said second plurality of blocks are sub blocks of corresponding ones of said first plurality of blocks.

14. The machine readable medium of claim 13, further comprising one or more instructions for receiving, from said user, a first name to be associated with blocks identified for said first construct of interest, wherein identifying associates each of said first plurality of blocks to said first name, wherein said indication indicates that said second rule is to be applied to blocks associated with said first name.

15. The machine readable medium of claim 13, wherein each of said plurality of rules specifies a corresponding display format, further comprising one or more instructions for:

displaying, on said display unit, said software code in a default display format;

in response to said identifying, displaying said first plurality of blocks in a first display format specified by said first rule; and in response to said determining, displaying said second plurality of blocks in a second display format specified by said second rule, wherein said default display format, said first display format and said second display format are different from each other, whereby said user is enabled to view the effect of applying said first rule to said software code before viewing the effect of applying said second rule to said software code.

16. A digital processing system comprising:

a processor;

a display unit;

a random access memory (RAM);

a machine readable medium to store one or more instructions which when retrieved into said RAM and executed by said processor causes said digital processing system to analyze software code written in a column based programming language defined by a first grammar, said first grammar of said column based programming language specifying a plurality of constructs, each construct being required by said first grammar to start at a pre-specified column position in lines constituting the software code, said digital processing system performing the actions of:

providing, on a display unit, a visual interface designed to receive values identifying constructs of said column based programming language;

receiving, from a user using said visual interface, a first set of values corresponding to a first construct of interest;

generating, based on said first set of values and said first grammar of said column based programming language, a first rule indicating a string of characters that would constitute said first construct of interest, said first rule further indicating a first set of column positions at which lines of said software code are to be examined for the presence of said first construct of interest; and identifying, by applying said first rule to said software code, a first plurality of blocks in said software code, wherein each of said first plurality of blocks including lines matching said string of characters starting at said first set of column positions indicated by said first rule, wherein said first plurality of blocks respectively represent corresponding occurrences of said first construct of interest in said software code, wherein said generating incorporates said first set of column positions in said first rule based on said first grammar of said column based programming language without said user having to specify said first set of column positions.

17. The digital processing system of claim 16, further performing the actions of:

displaying, on said display unit, text constituting lines of said software code;

receiving, from said user, a selection of a portion of said text displayed on said display unit and an indication that a rule is to be generated based on said selection and said type; and determining that the first token in said selection is a begin token that indicates the beginning of said first construct of interest and the last token in said selection is an end token that indicates the end of said first construct of interest, wherein said generating generates said string of characters to include said begin token and said end token.

18. The digital processing system of claim 16, wherein said generating generates a plurality of rules based on values received from said user using said visual interface, said plurality of rules including said first rule and a second rule different from said first rule, further performing the actions of:

receiving, from said user, an indication that said second rule is to be applied to each of said first plurality of blocks; and determining, by applying said second rule to said software code, a second plurality of blocks matching a second string of characters indicated by said second rule, wherein said second plurality of blocks are sub blocks of corresponding ones of said first plurality of blocks.

19. The digital processing system of claim 18, further performing the actions of receiving, from said user, a first name to be associated with blocks identified for said first construct of interest, wherein identifying associates each of said first plurality of blocks to said first name, wherein said indication indicates that said second rule is to be applied to blocks associated with said first name.

20. The digital processing system of claim 18, wherein each of said plurality of rules specifies a corresponding display format, further performing the actions of:

displaying, on said display unit, said software code in a default display format;

in response to said identifying, displaying said first plurality of blocks in a first display format specified by said first rule; and in response to said determining, displaying said second plurality of blocks in a second display format specified by said second rule, wherein said default display format, said first display format and said second display format are different from each other, whereby said user is enabled to view the effect of applying said first rule to said software code before viewing the effect of applying said second rule to said software code.

* * * * *